Sept. 9, 1952      M. J. SMITH      2,609,832
FLUID PRESSURE REGULATOR
Filed July 6, 1946
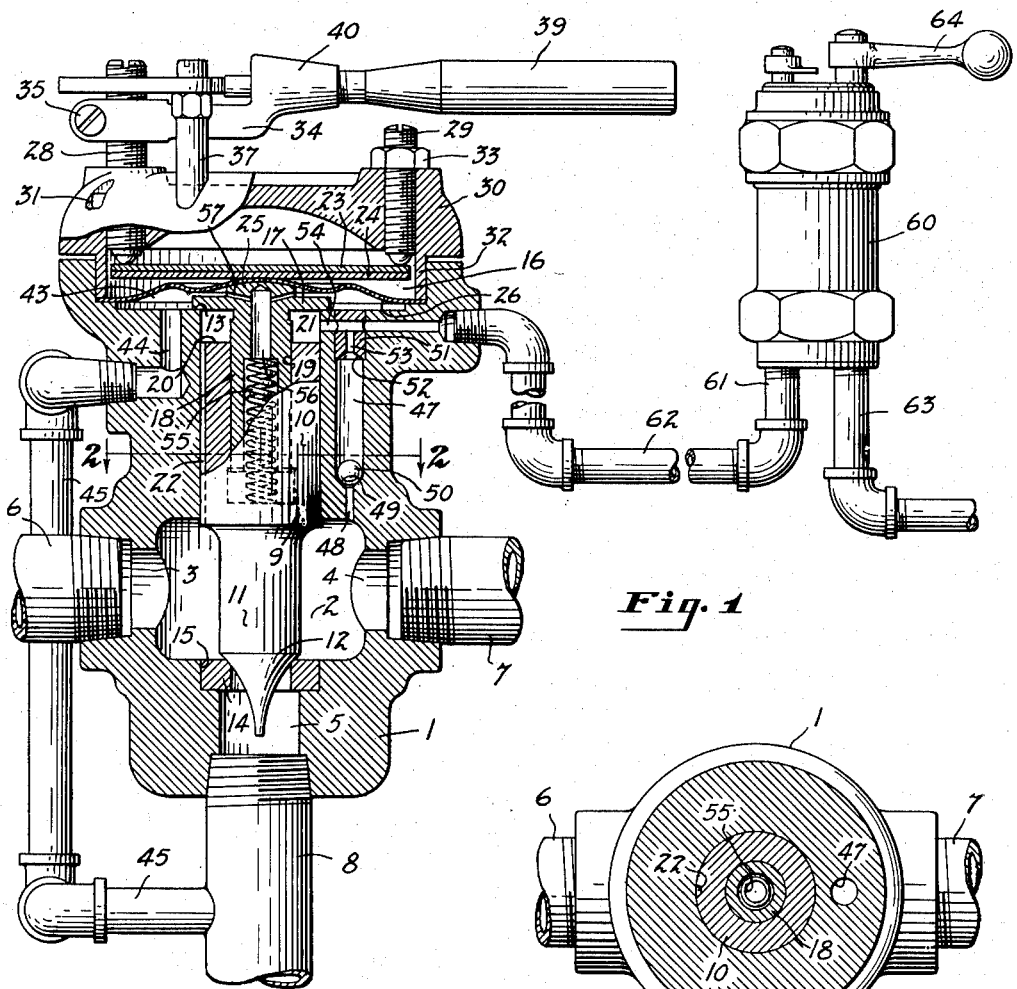
Fig. 1
Fig. 2
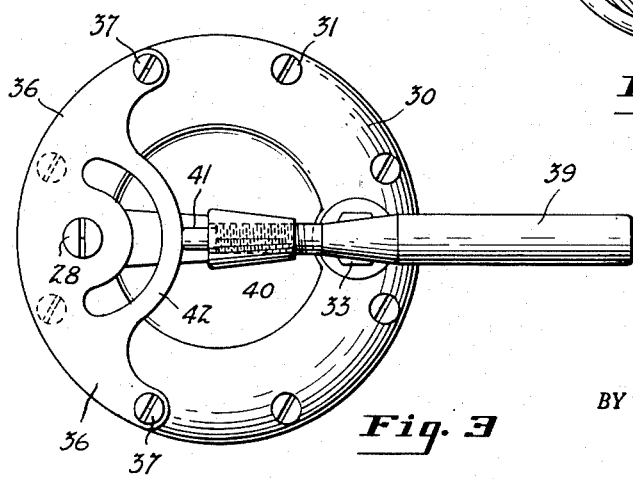
Fig. 3
INVENTOR.
Merton J. Smith
BY
Evans + McCoy
ATTORNEYS Patented Sept. 9, 1952

2,609,832

UNITED STATES PATENT OFFICE 2,609,832

FLUID PRESSURE REGULATOR

Merton J. Smith, Cleveland, Ohio

Application July 6, 1946, Serial No. 681,647

5 Claims. (Cl. 137—489)

This invention relates to fluid control valves and more particularly to valves for regulating or maintaining a predetermined pressure in a fluid system.

In numerous fluid systems, particularly hydraulic in character, it is desirable to maintain a predetermined pressure or pressure range so that the performance or operation of devices or instrumentalities utilizing the hydraulic liquid or fluid will operate in accordance with predetermined characteristics.

Pressure regulating control valves for fluids customarily employ an element such as a diaphragm or piston yieldingly balanced by resilient means or between fluid or liquid bodies, one or both of which is continuous with the fluid in the system, the pressure responsive element being connected to the valve mechanism so as to release or by-pass fluid from the system when the pressure therein exceeds a predetermined value. Many difficulties are encountered in the design and construction of such regulating valves, particularly in connection with high pressure applications. For example, sluggish operation of the pressure responsive element causes poor regulation of the fluid pressure and inability on the part of the valve to maintain the fluid or liquid pressure within close limits.

Another difficulty involves the loss of fluid from the control chamber contiguous to the pressure responsive element during periods of non-use of the regulator. Such loss of fluid results in a tardy recovery of the valve when put into operation.

The large inertia of the parts resulting from the use of relatively heavy sections, especially in high pressure work, interferes with the response of the valve to pressure fluctuations such that erratic control follows or even "hunting" of the valve to pressures above and below that for which it is set.

It is therefore one of the principal objects of the present invention to provide an improved pressure regulating or control valve for fluid systems which will largely overcome the difficulties and problems mentioned and will maintain fluid in such systems within close predetermined pressure limits.

Another object is to provide a pressure control valve of the character mentioned which is capable of adjustment for the purpose of varying the limiting pressure or pressures which the valve maintains in the system in which it is installed.

Another object is to provide a fluid pressure controlling arrangement in which the pressure range or limits can be varied at a point remote from the location of the regulating valve. More specifically, the invention aims to provide a pressure regulating valve for establishing an upper limiting pressure in a hydraulic system which the fluid or liquid is not permitted to exceed, in combination with a remote control valve hydraulically coupled to the pressure regulating valve in such manner as to vary the limiting pressure at which the regulating valve functions to release fluid from the system. The control valve remote from the regulating valve but hydraulically connected thereto, preferably varies the pressure at which the regulating valve releases fluid from the system over a range of pressure below the upper limiting pressure to which the regulating valve is adjusted.

Another object of the invention is to provide a pressure regulating valve in which improved means is included for adjustment while the valve is in operation to vary the limiting pressure at which the valve functions to release fluid from the system in which it is connected.

A further object of the invention is to provide in a fluid regulating valve which incorporates a pressure responsive element balanced between fluid bodies, means for rapidly introducing into the chamber provided for one such balancing body of fluid of a quantity of fluid to replace that lost from such chamber during inactivity of the valve.

A still further object of the invention is to provide a pressure regulating system for fluids, and in particular a pressure regulating valve, simple in design and construction and relatively inexpensive to manufacture. Other objects and advantages will become apparent from the following detailed description of a suitable embodiment of the invention made in connection with the accompanying drawings wherein:

Fig. 1 is an elevational view partly in section and with parts broken away or removed, illustrating a regulating valve in combination with a control valve utilized to monitor the regulating valve;

Fig. 2 is a sectional detail taken substantially on the line 2—2 of Fig. 1; and

Fig. 3 is a top plan view of the regulating valve shown in Fig. 1.

The pressure regulating system contemplated by the present invention includes a regulating valve shown at the left in Fig. 1 and a control valve shown at the right in Fig. 1. The control valve may be of conventional construction such as that disclosed in my prior Patent 2,336,968, issued Dec. 14, 1943. The purpose of the control valve, as will more fully appear hereinafter, is to maintain in the control chamber of the regulating valve a fluid pressure of a predetermined amount. Apart from the system or combination features, the present invention is therefore concerned chiefly with the design and construction of the regulating valve.

The regulator comprises a housing or casing 1, which may be formed as by casting of iron, steel, brass, bronze or similar material. Internally of the casing is formed a main fluid chamber 2 from which lead inlet and discharge passages 3 and 4 and an outlet passage 5. The fluid, such as oil or other hydraulic liquid, is supplied to the main chamber 2 through a pipe or conduit 6 threaded into a socket continuous with the inlet passage 3 and formed in a boss on the casing 1. Fluid or liquid flowing or being drawn from the valve for use in the system in which the valve is installed is conducted away through a pipe 7 threaded into the socket continuous with the discharge passage 4 and formed in a boss on the casing 1. The threaded bosses which receive the inlet pipe 6 and the outlet pipe 7 may be conveniently located on opposite sides of the casing.

An outlet or return pipe 8 is threaded into a socket in the bottom of the valve casing 1, the socket being continuous with the outlet passage 5. Thus the return pipe 8 receives fluid or liquid escaping into the outlet 5 from the main fluid chamber and may conduct such fluid back to a sump or supply from which the fluid or liquid of the system is supplied.

In the upper end of the casing is formed a circular cylinder 9 continuous with the fluid chamber 2. A piston 10 is slidable in the cylinder and at its lower end is exposed to the pressure of the fluid in the chamber 2. An axial extension 11 on the lower end of the piston 10 extends through the fluid chamber 2 and terminates at its lower end in a tapered or conical valve body 12, which normally makes circumferential sealing contact with a circular valve seat formed on an insert 14 received in a socket portion 15 at the opening into the outlet passage 5. The circular valve seat on the insert 14 is axially aligned with the cylinder 9 and piston 10. The valve body 12, when seated as shown in the figure, effects a seal with the valve seat and prevents the flow of fluid or liquid out of the chamber 2 through the outlet 5.

At its upper end, which is remote from the fluid chamber 2, the cylinder 9 opens into a shallow relatively large diameter circular chamber formed between the upper end of the main casing and a casing cap 30. A circular sealing or closure seat 13 is thus provided at the upper end of the cylinder and it extends about the entire periphery of the cylinder. A flexible circular diaphragm or sealing disc 26 divides the upper chamber into a spring housing portion 16 and a fluid receiving portion 43.

Disposed across the upper end of the cylinder 9 in sealing relation thereto and separating the cylinder from the chamber portion 43 is a poppet type closure 17 carried by a cylindrical stem 18 slidingly received in an axial cylinder or socket 19 formed in the piston 10. The closure 17 is thus mounted for axial movement toward and away from the piston 10 and is movable into and out of circumferential sealing engagement with the circular seat or shoulder 13 at the upper end of the cylinder 9. The parts are so proportioned that between upper end 20 of the piston 10 and the closure 17 is an annular fluid control chamber 21 which surrounds the stem 18 of the closure.

Fluid or liquid from the main fluid chamber 2 is conducted into the control chamber 21 through a relatively small capacity communicating passage 22, which may be in the form of a channel or groove disposed axially along the surface of the piston 10. Thus the piston 10 may be balanced between the pressure of fluid in the chamber 2 acting against the under-side thereof and fluid in the control chamber 21 acting against the upper end of the piston. The diameter of the cylinder or socket 19 which receives the stem 18 of the closure 17 is less than the diameter of the circular contacting surface of the valve seat on the insert 14, which is engaged by the valve body 12 in sealing the main fluid chamber 2 from the outlet passage. By thus making the diameter of the stem receiving cylinder 19 in the piston 10 less than the diameter of the main valve seat the effective area of the upper end 20 of the piston 10, which is subjected to the pressure of the fluid in the chamber 21, is appreciably greater than the effective area at the lower end of the piston structure, which is acted on by the fluid pressure in the main chamber 2. The difference in the effective areas at the opposite ends of the piston 10, which are subjected to the fluid pressures of the liquid bodies in the two chambers of the valve, results in the piston being normally urged downward to hold the valve body 12 in sealing engagement with the valve seat formed in the ring member or insert 14. The difference in effective areas at the opposite ends of the piston is sufficient so that even though the pressure in the control chamber 21 be less than that in the main fluid chamber 2, the resultant force on the piston 10 acts axially downward thereon as viewed in Fig. 1 to retain the valve body 12 sealed against the valve seat.

The closure 17 is held against the annular shoulder or seat 13 in sealing relation across the end of the cylinder 9 by a pair of circular spring discs 23 and 24 which are disposed in contacting superimposed relation in the chamber 16 at the upper end of the casing 1. The discs bear on the top convex or curved dome 25 formed on the closure 17, the sealing disc or diaphragm 26 of material such as copper or brass being interposed between the closure and the spring discs. At diametrically opposite points adjacent their peripheries the discs 23 and 24 are held by adjusting screws 28 and 29. These screws are threaded downwardly through the cover cap 30 secured across the upper end of the casing 1 as by a multiplicity of screws 31 disposed about the periphery of the cap and threaded into the casing. The casing 1 and the cap 30 constitute the casing means for the regulator and cooperatively define the chamber in the top of the device which is aligned with the cylinder 19.

A circular, axially disposed sleeve or flange 32 is formed adjacent the periphery on the underside of the cap 30 and is slidingly received in a large diameter circular opening in the upper end of the casing 1. This flange bears on the circumferentially extending peripheral edge of the flexible diaphragm 26 to sealingly press the latter against the floor of the chamber preventing loss of fluid or hydraulic liquid through the top of the valve.

The screws 28 and 29 are initially adjusted to provide the desired pressure on the opposite edges of the spring discs 23 and 24 and the screw 29 is held by locking nut 33. Adjusting screw 28 is embraced by a split socket formed on the end of an adjusting arm 34, the arm being locked on the screw by a tightening screw 35. The upper end of the screw 28 is guided for rotation in an arcuate plate 36. This plate is supported on the upper ends of posts 37 threaded into the cap 30. An extension handle 39 has one end threaded through a socket formed in an offset end portion 40 of the arm 34. End 41 of the arm 39 thus may be made to extend through the socket 40 and bear against an arcuate spring portion 42 of the plate 36 to lock the arm 34 in any relative rotative position. When the adjusting arm 34 is released by backing off the end 41 of the extension arm 39 from bearing engagement against the spring portion 42 of the plate, the adjusting arm may be actuated to turn the screw 28 thereby increasing or decreasing the yielding pressure of the spring discs 23 and 24 on the dome 25 of the closure 17.

Fluid pressure in the control chamber 21 sufficient to overcome the force exerted on the closure 17 by the spring discs 23 and 24 raises the closure 17 from its seat 13 on the end of the cylinder 9, releasing fluid from the control chamber to flow into the chamber portion 43 in the upper end of the casing structure or means. The chamber portion 43 is located beneath the flexible diaphragm partition 26, which prevents released fluid from flowing into the upper spring chamber 16. Fluid which flows into the chamber portion 43 is discharged through passage 44 formed in the casing 1 and conducted through pipes 45 to the return pipe 8 previously mentioned. The release of liquid from the control chamber 21 lowers the pressure therein, unbalancing the piston 10 and causing the latter to be moved axially in the cylinder by the pressure of fluid in the main chamber 2 to withdraw the valve body 12 from the outlet valve seat. Fluid is thus released or unloaded from the main chamber and the pressure of the fluid in the system "regulated" to the desired maximum.

In normal operation of the regulator, fluid such as hydraulic liquid supplied from a suitable source or pump enters the main chamber 2 through inlet pipe 6 and flows out of the valve through the discharge pipe 7 for use as desired. Fluid flows from the main chamber 2 into the control chamber 21 through the relatively small passage 22 formed in the piston. By reason of the area of the piston at its upper end 20 which is subjected to the fluid pressure in the control chamber 21 being greater than the piston area at its lower end subjected to the lifting pressure of the fluid in main chamber 2 the piston is held down to retain the valve body 12 in sealing relation to the valve seat of the outlet or unloading fluid passage 5.

As the pressure in the main chamber 2 increases to that for which the valve is adjusted, the fluid pressure in the control chamber 21 also increases and at a predetermined pressure overcomes the force in the spring discs 23 and 24 sufficiently to continuously release a small amount of liquid or fluid to flow out of the control chamber 21 into the chamber portion 43 and thence through the passage 44, pipes 45 and 8, to the return sump or fluid supply. Such "cracking" open of the closure 17 results in a continuous flow of liquid through the small passage 22 from the main liquid chamber 2 into the control chamber 21. Thus the pressure in the control chamber normally does not build up beyond a predetermined value which is somewhat less than the maximum or "unloading" value for which the valve is set to release fluid from the main chamber 2 through the outlet 5. For example, if the valve is set to "unload" at 1,000 pounds the yielding force of the spring discs 23 and 24 is adjusted so that the closure 17 will be moved to "crack open" and release liquid from the control chamber 21 at about 950 pounds, and the closure 17 will remain "cracked open" and continue to release liquid from the control chamber so long as the pressure therein exceeds about 950 pounds. Fluid thus released is of course continuously replenished through the small passage 22 so that when the valve is operating at a pressure approaching the setting at which it will unload, there is a continuous flow through the small passage 22, the control chamber 21 and return to the supply through the pipes 45 and 8.

Although the pressure in the control chamber 21 when operating above the "cracking" pressure is thus less than that in the main fluid chamber 2, the area of the upper end 20 of the piston 10 exposed to the fluid pressure in the control chamber is sufficiently larger than the area at the lower end of the piston which is subjected to the higher pressure from the main chamber 2 to force the piston down and hold the valve body in sealing engagement with the outlet valve seat.

The precise difference in the effective areas of the two ends of the piston is not critical. The greater the difference in these areas the greater will be the "sensitivity" of the valve and the more rapidly will it respond to fluctuations of pressure in the system calling for opening or closing of the main release valve. If, however, the ratio of effective areas at the two ends of the piston is made too large a greater pressure differential is required in the two fluid bodies resulting in a heavier or larger flow of liquid past the closure 17. An excessive flow of liquid past the closure 17 is inefficient and the flow is desirably held to a minimum.

By proportioning the effective areas at the ends of the piston so that the end exposed to the pressure in the control chamber 21 is only slightly greater than that at the other end of the piston acted on by the liquid in the main chamber 2, the flow or loss of liquid during "cracking" open of the closure 17 is reduced. Liquid flowing to the control chamber 21 through the small passage 22 is released past the closure 17 and effects the efficiency of the valve. Generally it is desired to keep this flow to a minimum. If the area of the by-pass passage 22 is decreased to reduce the loss of liquid past the control closure 17, the sluggishness in response of the regulator is increased. For average use, a passage having an area equal to one about $\frac{1}{64}$ inch in diameter operates satisfactorily in a piston $1\frac{1}{2}$ inches in diameter and $2\frac{1}{4}$ inches long.

The above factors are items that must be considered in proportioning the parts of the valve to suit the construction and arrangement of the present invention for different applications. It is to be observed that the present valve can be readily modified to change the proportion or ratio of the effective areas at the ends of the piston 10. To increase the relative area subjected to the control chamber pressure, the diameter of the cylinder 19 and stem 18 is reduced. Conversely, to decrease the area under the influence of liquid pressure at the upper end of the piston, the diameter of the cylinder 19 and stem 18 is increased. The valves may be supplied with interchangeable sets of pistons 10 and closures 17, so that modification may be effected as desired.

In the embodiment illustrated the parts are so proportioned that the area of the piston end 20 and the area at the lower end of the piston subject to upward acting liquid pressure are in the ratio of about 5 to 4. Such an arrangement is satisfactory for average applications as in hydraulic systems employed in aircraft for actuating landing gear and the like. Such systems may employ pressures in the neighborhood of 500 pounds and in the design illustrated and described herein the closure 17 customarily "cracks" open at about 475 pounds and the main valve unloads at 500 pounds to maintain the latter pressure in the system.

During a period of idleness in which pressure is not maintained in the system, liquid may drain out of the control chamber 21 leaving such chamber without a liquid body to resist upward or main valve opening movement of the piston 10 upon reactivation of the system. The area of the by-pass 22 is so small that it resists the rapid flow of fluid therethrough, making it inadequate to insure filling of the control chamber 21 when the system is placed in operation. Should the piston 10 be moved upward upon the initial flow of high pressure liquid into the main chamber 2, when starting up the system after a period of idleness, the incoming high pressure liquid might be released through the outlet 5 preventing the building up of liquid pressure in the system as desired.

To provide a supply of liquid for the control chamber 21 available upon starting up the hydraulic system after a period of idleness, an auxiliary supply chamber and passage 47 is formed in the casing 1 to one side of the cylinder 9. The chamber or metering passage portion 47 communicates with the main liquid chamber 2 through a passage 48, there being a conical shoulder at the lower end of the chamber 47 providing a valve seat 49 engageable by a ball valve 50 to seal the passage 48. The chamber 47 may be formed by a drill hole paralleling the cylinder 9 and fitted at its upper end with a threaded plug 51. This plug has passages 53 opening into the chamber 47 and is formed with a conical seat 52 also engageable by the ball valve 50 to seal the passages 53 which communicate with passages 54 in the casing leading to the control chamber 21.

When introducing high pressure liquid into the main chamber 2 after a prolonged period of idleness, such that liquid has drained from the control chamber 21, liquid flows upwardly through passage 48 into the auxiliary chamber 47, pushing the ball 50 upwardly through the auxiliary chamber. The diameter of the ball is only slightly less than that of the auxiliary chamber so that the ball moves upwardly with the incoming oil, forcing liquid that had been entrapped in the auxiliary chamber by the ball, while the valve was idle, to flow upwardly through the passages 53 and 54 and into the control chamber 21. When the valve element or ball 50 engages the upper conical seat 52, the continuous passage through the auxiliary by-pass circuit between the chambers 2 and 21 is sealed, arresting the further flow of liquid upwardly therethrough. Thus a predetermined measured quantity of liquid is initially introduced into the control chamber 21 when placing the valve in operation after a period of idleness.

The passages 48, 53 and 54, as well as the auxiliary chamber 47 are considerably larger than the relatively small by-pass passage 22 formed in the piston, so that a relatively rapid flow of liquid through the auxiliary chamber is effected. Furthermore, the sealing and metering ball 50 is small in mass as compared to the piston 10 so that the inertia of the ball is less than that of the piston and the measured quantity of replacement liquid from the auxiliary chamber 47 is rapidly forced into the control chamber 21 before the piston 10 is appreciably moved upward by the incoming liquid entering the main chamber 2 when the valve is started up after inactivity. During operation of the regulator the snug fit of the ball 50 in the cylindrical auxiliary chamber 47 minimizes the flow of liquid around and in by-passing relation to the ball, thus holding the ball sealingly against one of the conical valve seats therefor.

As previously mentioned, it is the differential in hydraulic pressures acting on the opposite ends of the piston 10 which effects movement of the piston in opening and closing the main unloading valve. As an aid to the function of the piston 10 to keep the valve body 12 in sealing engagement with the outlet valve seat, as when the valve is empty, and to augment the force of he liquid pressure acting on the upper end 20 of the piston, a helical coil compression spring 55 is interposed between the piston 10 and the stem 18 of the closure 17. The spring 55 is received in an axial socket formed in the stem 18 and bears against the bottom of the socket 19 formed in the piston 10. The coil spring 55 is relatively weak compared to the spring discs 23 and 24 and although it acts as a resilient means in opposition to the force of the first resilient means or spring discs, such opposition force is relatively minor being only sufficient to overcome gravity and the friction of the parts to move or bias the piston to hold the valve body 12 against the outlet valve seat. Liquid working into the socket 19 of the piston and into the socket housing the helical coil spring 55 is released through passages 56 and 57 in the valve stem 18 and dome 25, respectively. Such liquid is thus released into the chamber portion 43 beneath the flexible diaphragm 26 to flow out the passage 44 and into the return pipe 8 through the pipes 45.

The present pressure regulator may be varied to alter the pressure at which the piston 10 withdraws the valve body 12 from the main outlet valve seat to release liquid from the main chamber 2 through the outlet 5. Rotation of the adjusting screws 28 or 29, as by the arm 34 previously described, acts to increase and decrease the pressure on opposite points of the spring discs 23 and 24. An increase in the stress of these springs in this manner causes them to hold the closure 17 in sealing relation across the end of the cylinder 9 with greater force requiring a higher liquid pressure in the control chamber 21 to raise the closure and relieve the fluid pressure in the control chamber. In the operation of many hydraulic devices it is desirable to maintain a predetermined maximum pressure in the hydraulic system and to vary the pressure over a range below the predetermined maximum. The regulating valve of the present invention functions to maintain the liquid pressure in a hydraulic system below a predetermined maximum and when used in conjunction with a valve such as the control valve indicated at 60 will additionally operate to vary the pressure in the system over a range below the predetermined maximum.

The valve 60 if constructed in accordance with the disclosure in my prior patent, 2,336,968, has inlet 61, which communicates with the inlet 35a shown in the patented valve, connected by conductor pipes 62 threaded into the passage 54 leading into the control chamber 21 of the pressure regulating valve. Outlet conduit 63 of the control valve 60 is so connected as to return spent liquid to the sump or supply and if desired may be connected to the return pipe 8 previously mentioned.

The control valve 60 may be located at a point remote from the regulating valve if desired and is actuated or adjusted as by handle 64 corresponding to the arm 28 shown in the patent to determine the pressure maintained in the control chamber 21 of the regulating valve. For example, if the regulating valve is set by adjustment of the arm 34 to maintain 800 pounds pressure in the hydraulic system, including main liquid chamber 2, the valve 60 may be set to maintain an adjustable pressure in the control chamber 21 over a range below 800 pounds.

The passage 54 and the openings through the pipes 62, inlet 61 and the internal passages of the control valve 60 are all larger than the small capacity passage 22 in the piston 10. Thus liquid does not flow in sufficient quantity into the control chamber 21 through the small passage 22 to replenish that which may be drained from the control chamber 21 through the control valve 60. Hence when the control valve 60 thus reduces the pressure in the control chamber 21 below that which would otherwise prevail, the piston 10 becomes unbalanced and the liquid pressure on the under-side thereof raises the piston to withdraw the valve body from the outlet valve seat and unload the main chamber 2. In this manner the control valve 60 can vary the pressure at which the regulating valve will unload the hydraulic system, while at the same time the main regulating valve prevents the pressure in the system from exceeding a predetermined maximum high value, regardless of the setting of the control valve 60.

The provision of the relatively large capacity outlet closure 17 for the control chamber 21 promotes a positive, quick acting release action on the part of the regulating valve, should a high pressure surge occur in the system. The slight raising movement of the closure 17 from sealing engagement across the end of the cylinder 9 permits a rapid, relatively large flow of liquid out of the control chamber, quickly emptying the latter under the influence of the pressure forcing the piston 10 upwardly. Thus the piston can be moved rapidly to quickly withdraw the valve body 12 from the valve seat of the outlet 5. Such movement of the closure 17 also operates to decrease the sealing force bias of the resilient spring means 55 acting to hold the valve body 12 against the outlet valve seat. Excessively high pressures are thus avoided in the system and damage to the parts is minimized.

In utilizing a plurality of the spring discs 23 and 24 for supplying the force which holds the closure 17 in sealing relation across the outlet for the control chamber, the friction of the spring discs one against the other is utilized in reducing any tendency of the closure 17 to vibrate or chatter during operation. The frictional resistance in the disc springs damps out vibration resulting in a smooth working valve which operates to maintain a uniform steady pressure in the system.

The principles of the present invention may be utilized in various ways, numerous modifications and alterations being contemplated, substitution of parts and changes in construction being resorted to as desired, it being understood that the embodiment shown in the drawings and described above and the particular method set forth are given merely for purposes of explanation and illustration without intending to limit the scope of the claims to the specific details disclosed.

What I claim is:

1. In a fluid pressure regulating valve having casing means defining a main fluid chamber, an inlet passage therefor, and a cylinder, a piston slidable in the cylinder and subjected at one end to the pressure of fluid in the chamber, means defining a control fluid chamber at the other end of the piston, said other end being subjected to the pressure of fluid in the control chamber whereby to hydraulically balance the piston in the cylinder, a release outlet for the control chamber and a movable closure therefor, said closure having a stem smaller than and received within the piston, said closure stem having sliding engagement with the piston to be guided thereby, resilient means acting to maintain the closure in sealing relation to the release outlet, an outlet passage communicating with the main fluid chamber, a valve body movable to open and close the outlet passage, said valve body having connection with the piston to be actuated thereby, and other resilient means interposed between the piston and the closure to bias the piston to actuate the valve body for closing the outlet passage.

2. In a fluid pressure regulating valve having a casing defining a main fluid chamber and a cylinder communicating therewith, inlet and outlet passages communicating with the chamber, a piston slidable in the cylinder and subjected at one end to the pressure of fluid in the chamber, a fluid release outlet having communication with the other end of the cylinder, a closure disposed across the cylinder at said other end of the piston in sealing relation to the release outlet, a valve body for the main chamber outlet and means connecting the same to the piston to be actuated thereby, the closure having a stem smaller than and received within the piston, said closure stem and piston having sliding connection with one another whereby the closure is guided by the piston in movement to seal and open the release outlet, resilient means interposed between the closure and piston acting to bias the piston to actuate the valve body in the direction of passage closing movement, means providing a small fluid conducting passage for gradual pressure equalizing flow of fluid between the ends of the piston, and means for yieldingly holding the closure in sealing relation across the cylinder to confine a body of fluid between the closure and the piston.

3. In a fluid pressure regulating valve having a casing defining a main fluid chamber with inlet and outlet passages for the chamber and a cylinder opening into the chamber, said cylinder being axially aligned with the outlet opening, a piston member slidable in the cylinder and formed at one end with a valve body adapted to seal the outlet passage, a closure disposed across the cylinder in sealing relation with the walls thereof at the other end of the piston and spaced from the latter providing therebetween a control fluid chamber in the cylinder, said closure having a stem axially slidable in the piston to be guided thereby during relative movement of the parts, yieldable resilient means acting on the closure to retain the same in sealing relation across the cylinder, and a relatively small fluid conducting passage connecting the main fluid chamber and the control fluid chamber to provide for pressure equalizing flow of fluid between the chambers whereby normal increases in fluid pressure in the main fluid chamber are transmitted to the control chamber to equalize fluid pressure on both sides of the piston and pressure increases of large magnitude are transmitted through the piston to move the closure and open the same for release of liquid from the control chamber, permitting axial movement of the piston relative to the closure and to open the outlet passage.

4. In a fluid pressure regulating valve having a casing defining a main fluid chamber with inlet and outlet passages and a cylinder opening into the chamber, a piston slidable in the cylinder and having at one end a valve body normally sealing the outlet passage, a movable closure disposed sealingly across the cylinder in the region of the other end of the piston, a stem on the closure slidingly received in the piston to be guided thereby, said other end of the piston normally being spaced from the closure to provide therebetween a control fluid chamber surrounding the stem, the piston in the cylinder being disposed between the bodies of fluid in the main and control chambers, a relatively small fluid conducting passage connecting the chambers for gradual pressure equalizing flow therebetween, and resilient means acting on the closure to retain the same in sealing relation across the end of the cylinder, said resilient means being yieldable upon sudden increases of fluid pressure in the main chamber acting through the piston and control chamber fluid to open the closure and permit rapid release of fluid from the control chamber whereby the piston is hydraulically actuated to open the outlet passage.

5. In a pressure regulating valve for a hydraulic system, the valve being of the type comprising means defining a main chamber, an inlet opening thereinto for placing the chamber in communication with the system and an outlet opening for releasing fluid from the chamber, a valve body for sealing the outlet opening, means defining a control chamber, a movable member interposed between the chambers and connected to the valve to actuate the latter in opening and closing the outlet opening, said member being subject to differential fluid pressures in the chambers in effecting valve body actuation, and means for releasing fluid from the control chamber to permit fluid pressure induced movement of the member to actuate the valve body and open the outlet opening, the improvement which comprises means defining separate passages connecting the chambers, one passage being located in the actuating member, another being located in the chamber defining means, and means associated with one of the passages for limiting the flow of fluid therethrough to a predetermined quantity.

MERTON J. SMITH.

REFERENCES CITED

The following references are of record in the file of this patent:

UNITED STATES PATENTS

| Number | Name | Date |
|---|---|---|
| 190,884 | Maurel | May 14, 1877 |
| 934,083 | Mills | Sept. 14, 1909 |
| 1,379,092 | Fraccascia | May 24, 1921 |
| 1,568,057 | Carr | Jan. 5, 1926 |
| 1,786,283 | Ardern | Dec. 23, 1930 |
| 2,150,266 | Cotner | Mar. 14, 1939 |
| 2,335,829 | McBride | Nov. 30, 1943 |
| 2,336,968 | Smith | Dec. 14, 1943 |
| 2,351,873 | Parker | June 20, 1944 |
| 2,360,816 | Pasco | Oct. 17, 1944 |
| 2,388,820 | Bonnell | Nov. 13, 1945 |